April 28, 1925.  L. HORST  1,535,606
PHOTOGRAPHIC DEVICE
Filed June 21, 1922
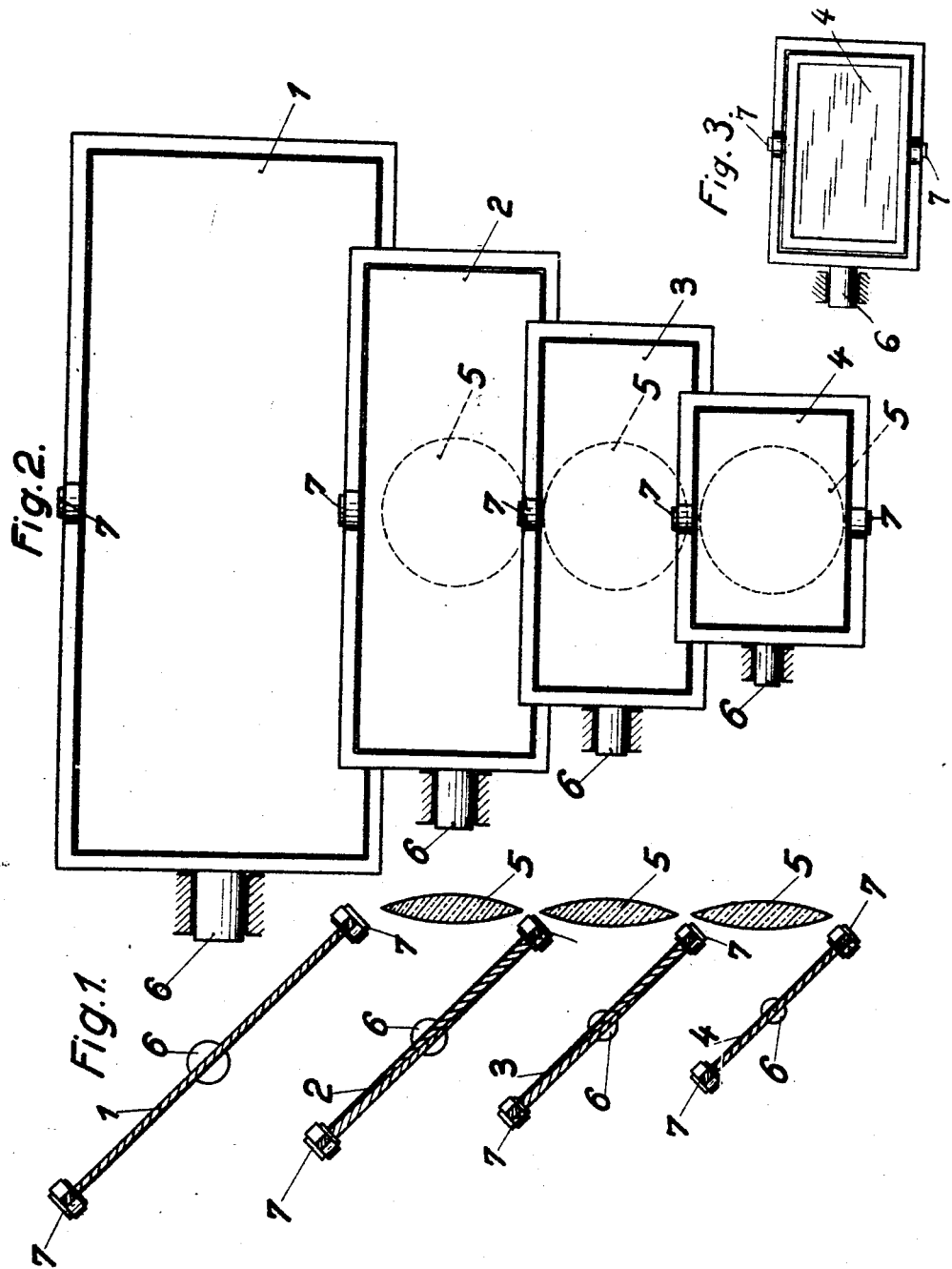
Inventor:
LUDWIG HORST Patented Apr. 28, 1925.

1,535,606

UNITED STATES PATENT OFFICE.

LUDWIG HORST, OF BERLIN-WILMERSDORF, GERMANY.

PHOTOGRAPHIC DEVICE.

Application filed June 21, 1922. Serial No. 569,925.

*To all whom it may concern:*

Be it known that I, LUDWIG HORST, a citizen of the Republic of Germany, residing at Berlin-Wilmersdorf, Germany, have invented certain new and useful Improvements in Photographic Devices; and I do hereby declare the following to be a full, clear, and exact description of the invention.

The present invention relates to a device for the production of photographs in natural colours, especially for kinematographic purposes. The characteristic feature of the invention consists in that the rays of light are directed by means of a relatively large collecting mirror upon the three successive objective-mirrors which are decreasing in size by steps. On aćocunt of the small kinematographic pictures the focal distance is short. These short distances show the disadvantage that the mountings of the mirrors or the silver-plated strips are also photographed. Therefore, it is necessary to bring the mirrors, movable towards all directions, directly in front of the lens of the objective. In order to obtain a large angle of picture, it is necessary to provide a very large mirror. The objective-mirrors are stepped in size in such a way that the uppermost mirror is larger than the middle one and the latter larger again than the rear mirror. By such graduation of size in connection with the large collective mirror the photographing of the mountings of the mirrors will not take place, though the perspective plane will be increased respectively.

Supposed for instance the mirror close to the first objective be just as big as the collecting mirror, in such case the back side of the mountings of the collecting mirror would be photographed by the first objective. This also applies to the other objectives and mirrors.

In order to prevent the formation of double images, wedge-shaped prisms are provided for the uppermost and middle objective.

The distribution of light without a blind before the objective may be effected in such a manner that the lower angle of the prism in the middle mirror is transparently silver-plated.

A mode of construction according to the present invention is shown in the drawing in which—

Fig. 1 shows a cross-section of the device;

Fig. 2 a front view, and

Fig. 3 an objective-mirror.

1 designates the collecting mirror, 2, 3, 4 the objective-mirrors and 5 the objectives. Both the collecting mirror and the objective-mirrors are movable, namely each mirror is mounted by means of pivots 7 in a frame, which latter is turnable about a pin 6 (Fig. 3). The objective-mirrors 2, 3, 4 are stepped as regards both their breadth and height (Fig. 2). The objective-mirrors are arranged immediately in front of the objectives in order to produce in connection with the large collecting mirror the largest perspective plane imaginable for the bottommost objective.

I claim:

1. A device for producing series of colored pictures in natural colors free of any parallaxes as regards space and time, especially for kinematographic purposes, comprising a relatively large movable collecting mirror (1) and three objective-mirrors (2, 3, 4) partially reflecting and partially transmitting turnable in all directions, arranged in succession immediately in front of the objectives and decreasing by steps as regards their length and breadth.

2. In a device for the production of pictures in natural colors, free from time and space parallax, a relatively large collecting mirror to include a wide angle of incidence, three objectives, and three universally movable objective mirrors therefor one behind the other in line from but at an angle to the collecting mirror and directly in front of the objectives, the mirrors being partially reflecting and partially transmitting.

3. In a short focus photographic device of the class described, a relatively large collecting mirror and a plurality of universally movable objective mirrors, partially reflecting and partially transparent, the objective mirrors being on a line from the collecting mirror and graduated downwardly in size both as to length and width.

4. In a natural color photographic device for motion pictures, a collecting mirror, and a plurality of objective mirrors in line therewith, partially reflecting and partially transmitting, an objective for each objective mirror, and a universal mounting for adjusting each of the mirrors separately.

5. In a photographic device of the class described, a plurality of universally movable objective mirrors arranged and adjustable in line one behind the other, partially reflecting and partially transmitting, the mirrors in front of the last one being provided with wedge shaped prisms to prevent the formation of double images.

In testimony that I claim the foregoing as my invention I have signed my name.

LUDWIG HORST.